US008948028B2

(12) United States Patent
Zhang et al.

(10) Patent No.: US 8,948,028 B2
(45) Date of Patent: Feb. 3, 2015

(54) REPORTING OF TIMING INFORMATION TO SUPPORT DOWNLINK DATA TRANSMISSION

(75) Inventors: Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 12/903,050

(22) Filed: Oct. 12, 2010

(65) Prior Publication Data

US 2011/0085460 A1 Apr. 14, 2011

Related U.S. Application Data

(60) Provisional application No. 61/251,225, filed on Oct. 13, 2009.

(51) Int. Cl.
H04L 12/26 (2006.01)
H04W 56/00 (2009.01)
H04B 7/02 (2006.01)

(52) U.S. Cl.
CPC .............. *H04W 56/005* (2013.01); *H04B 7/024* (2013.01)
USPC ........................................................ 370/252

(58) Field of Classification Search
USPC .................. 370/328, 350, 310, 332
See application file for complete search history.

(56) References Cited

U.S. PATENT DOCUMENTS

| 5,828,659 | A | 10/1998 | Teder et al. |
| 6,760,599 | B1 | 7/2004 | Uhlik |
| 7,813,311 | B2* | 10/2010 | Dick et al. ................ 370/324 |
| 8,077,655 | B2* | 12/2011 | Padovani et al. ............. 370/328 |
| 2003/0114114 | A1 | 6/2003 | Itoh |

(Continued)

FOREIGN PATENT DOCUMENTS

| CN | 1968435 A | 5/2007 |
| CN | 101136695 A | 3/2008 |

(Continued)

OTHER PUBLICATIONS

Catt: "Aspects of Joint Processing for Downlink CoMP", 3GPP Draft; R1-090942, 3rd Generation Partnership Project (3GPP), Mobile Competence Centre ; 650, Route Des Lucioles ; F-06921 Sophia-Antipolis Cedex ; France, No. Athens, Greece; 20090204, Feb. 4, 2009, XP050318782.

(Continued)

*Primary Examiner* — Andrew Lai
*Assistant Examiner* — Zhiren Qin

(57) ABSTRACT

Techniques for reporting timing information to facilitate data transmission on a downlink are described. A user equipment (UE) may receive signals from a plurality of cells available for data transmission to the UE. Each cell may have a different propagation delay to the UE. The UE may determine timing information based on the received signals and may report the timing information to one or more of the cells. The timing information may include a receive time of each cell at the UE. The UE may receive a data transmission from at least one cell, which can be selected from the plurality of cells, based on the timing information. The at least one cell may provide a coordinated or a non-coordinated data transmission. A coordinated transmission mode may be determined based on the timing information and can include, for example, a joint transmission, a coordinated beamforming, or a coordinated silencing.

43 Claims, 8 Drawing Sheets

(56) References Cited

U.S. PATENT DOCUMENTS

| | | | |
|---|---|---|---|
| 2007/0025268 A1 | 2/2007 | Padovani et al. | |
| 2008/0214177 A1* | 9/2008 | Sehedic et al. | 455/422.1 |
| 2008/0273495 A1* | 11/2008 | Becker et al. | 370/331 |
| 2009/0046674 A1* | 2/2009 | Gao et al. | 370/337 |
| 2009/0052400 A1* | 2/2009 | Lee et al. | 370/331 |
| 2009/0147362 A1 | 6/2009 | Saito | |
| 2009/0280749 A1 | 11/2009 | Tanno et al. | |
| 2010/0046491 A1* | 2/2010 | Vermani et al. | 370/342 |
| 2010/0232374 A1 | 9/2010 | Ofuji et al. | |
| 2011/0007704 A1* | 1/2011 | Swarts et al. | 370/330 |
| 2011/0026626 A1* | 2/2011 | Sahlin et al. | 375/260 |
| 2011/0034175 A1* | 2/2011 | Fong et al. | 455/450 |

FOREIGN PATENT DOCUMENTS

| | | |
|---|---|---|
| JP | H06334593 A | 12/1994 |
| JP | H08500474 A | 1/1996 |
| JP | H10117165 A | 5/1998 |
| JP | 2002176666 A | 6/2002 |
| JP | 2006287754 A | 10/2006 |
| JP | 2008053865 A | 3/2008 |
| JP | 2009225137 A | 10/2009 |
| WO | WO9430024 A1 | 12/1994 |
| WO | WO2010036008 A2 | 4/2010 |

OTHER PUBLICATIONS

International Search Report and Written Opinion—PCT/US2010/052539—ISA/EPO—May 9, 2011.

Fujitsu,"Pseudo Transmission Timing Control using Cyclic Shift for Downlink CoMP Joint Transmission", 3GPP Draft, R1-091956, 3rd Generation Partnership Project (3GPP), Mobile Competence Centre , 650, Route Des Lucioles , F-06921 Sophia-Antipolis Cedex , France, No. San Francisco, USA, 20090428, Apr. 28, 2009, XP050339429.

Taiwan Search Report—TW099134974—TIPO—Aug. 12, 2013.

* cited by examiner

REPORTING OF TIMING INFORMATION TO SUPPORT DOWNLINK DATA TRANSMISSION

The present application claims priority to provisional U.S. Application Ser. No. 61/251,225, entitled "TIMING REPORT FOR COORDINATED MULTI POINT TRANSMISSION," filed Oct. 13, 2009, assigned to the assignee hereof and incorporated herein by reference.

BACKGROUND

I. Field

The present disclosure relates generally to communication, and more specifically to techniques for facilitating data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may be within the coverage of multiple cells, where the term "cell" can refer to a coverage area of a base station and/or a base station subsystem serving the coverage area. One or more of the multiple cells may be selected to serve the UE.

SUMMARY

Techniques for reporting timing information in connection with downlink data transmission are disclosed. A UE may receive signals from a plurality of cells available for data transmission to the UE. The plurality of cells may have different propagation delays to the UE. The UE may determine timing information for the plurality of cells based on the received signals. In one aspect, the UE may report timing information to one or more cells in the plurality of cells, including a serving cell for the UE. Based on the timing information, a coordinated or non-coordinated transmission may be determined and at least one cell may be selected to participate in the data transmission. A coordinated transmission mode (i.e., a type of coordinated transmission) may also be selected for the UE based on the timing information. The coordinated transmission mode may include, for example, a joint transmission, a coordinated beamforming, or a coordinated silencing.

In one aspect, a UE receives signals from a plurality of cells available for data transmission to the UE. The UE determines timing information for the plurality of cells based on the received signals and sends timing information in a timing report for the plurality of cells to facilitate data transmission. The timing information may convey the receive time of each cell at the UE and may be determined and provided in various manners as described herein. The UE may receive a data transmission from at least one cell among the plurality of cells. The at least one cell may be determined based at least in part on the timing information. For example, the at least one cell may each have a receive time within a timing window at the UE. The length of the timing window may be defined by a cyclic prefix of the downlink transmission. Use of the timing window may mitigate inter-symbol interference (ISI) and ensure good performance for downlink transmission(s) from the selected cell(s). The UE may also report channel state information for all or some of the plurality of cells. The data transmission may then be sent by the at least one cell based on the channel state information. Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
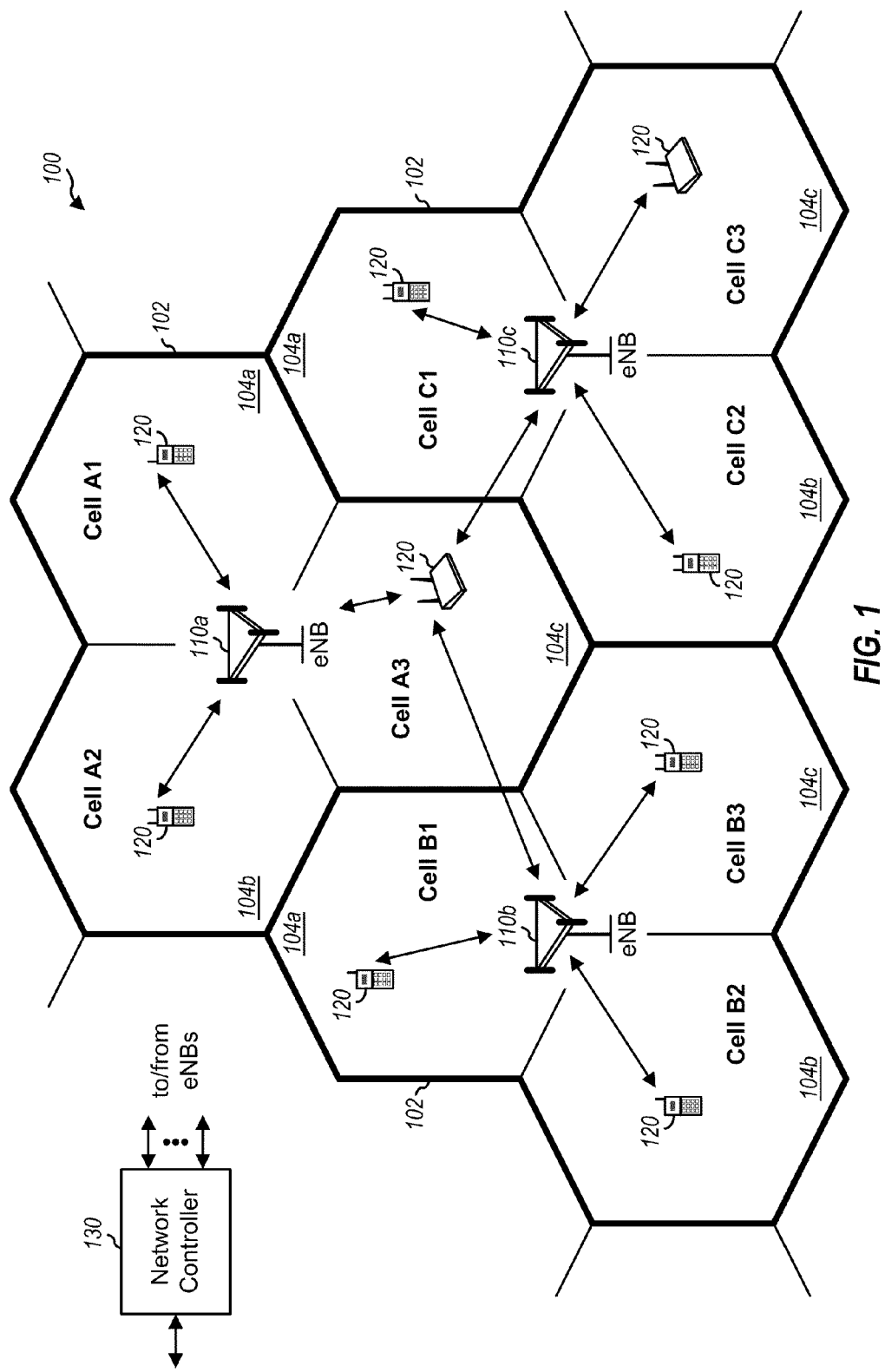
FIG. 1 shows a wireless communication network.

FIG. 1 shows a wireless communication network 100, which may be an LTE network or some other wireless network. Wireless network 100 may include a number of evolved Node Bs (eNBs) 110, user equipment (UEs) 120, and other network entities. For simplicity, only three eNBs 110a, 110b and 110c and one network controller 130 are shown in FIG. 1. An eNB may be an entity that communicates with the UEs and may also be referred to as a base station, a Node B, an access point, etc. Each eNB 110 may provide communication coverage for a particular geographic area 102. To improve network capacity, the overall coverage area of an eNB may be partitioned into multiple smaller areas, e.g., three smaller areas 104a, 104b and 104c.

Each of the smaller areas 104 may be served by a respective eNB subsystem. In 3GPP, the term "cell" can refer to the smallest coverage area of an eNB and/or an eNB subsystem serving this coverage area. In 3GPP2, the term "sector" or "cell-sector" can refer to the smallest coverage area of a base station and/or a base station subsystem serving this coverage area. For clarity, 3GPP concept of cell is used in the description below. In general, an eNB may support one or multiple (e.g., three) cells and one or more eNBs may coordinate to support a data transmission to a UE 120 at a particular location.

Network controller 130 may couple to a set of eNBs and may provide coordination and control for these eNBs. Network controller 130 may include a Mobile Management Entity (MME) and/or some other network entity.

UEs 120 may be dispersed throughout the wireless network, and each UE may be stationary or mobile. For simplicity, FIG. 1 shows only one UE 120 in each cell. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB via the downlink and uplink. The downlink (or forward link) refers to the communication link from the eNB to the UE, and the uplink (or reverse link) refers to the communication link from the UE to the eNB.

Wireless network 100 can support a coordinated data transmission or a non-coordinated data transmission to UEs 120 on the downlink. For a coordinated transmission (also referred to herein as a "coordinated multipoint (CoMP) transmission," and abbreviated as "CoMP"), multiple cells may coordinate to transmit data to one or more target UEs on the same time-frequency resource such that signals from the multiple cells can be combined at a target UE and/or inter-cell interference can be reduced at the target UE. As used herein, the following transmission modes may be provided by one or more eNBs in a coordinated transmission:

1. Joint processing—multi-point transmission of data from multiple cells to one or more UEs with precoding vectors at different cells being selected to achieve beamforming gain at a target UE and/or interference reduction at one or more interfered UEs,
2. Coordinated beamforming—single-point transmission of data from a single cell to a target UE with one or more precoding vectors selected for the cell by trading between beamforming gain to the target UE and interference reduction to one or more interfered UEs served by one or more neighbor cells, and
3. Coordinated silencing—transmission of data from one or more cells to a target UE on a given time-frequency resource, with one or more other cells not transmitting on the time-frequency resource to avoid causing interference to the target UE.

CoMP may include other transmission modes not listed above. Each CoMP transmission mode may involve multiple cells, which may include at least one cell transmitting data to the UE and possibly at least one other cell acting to reduce interference to the UE.

Multiple cells may transmit data to a given UE for joint processing whereas a single cell may transmit data to the UE in a coordinated beamforming. However, for both joint processing and coordinated beamforming, the precoding vector(s) used by one or more cells to transmit data to the UE may be selected by considering the channels of the UE as well as the channels of other UE(s) in order to reduce inter-cell interference. For example, a neighbor cell may transmit data to one of its UEs based on a precoding vector that is selected according the channel of the given UE to reduce interference. For each CoMP transmission mode, a designated entity (e.g., a serving cell 110, a network controller 130, etc.) may facilitate the coordinated transmission by determine which cells participate (e.g., a "CoMP set" for the UE) and sending data for the UE and/or other information (e.g., scheduling information, channel state information, precoding information, etc.) to all participating cells.

Figure 2:
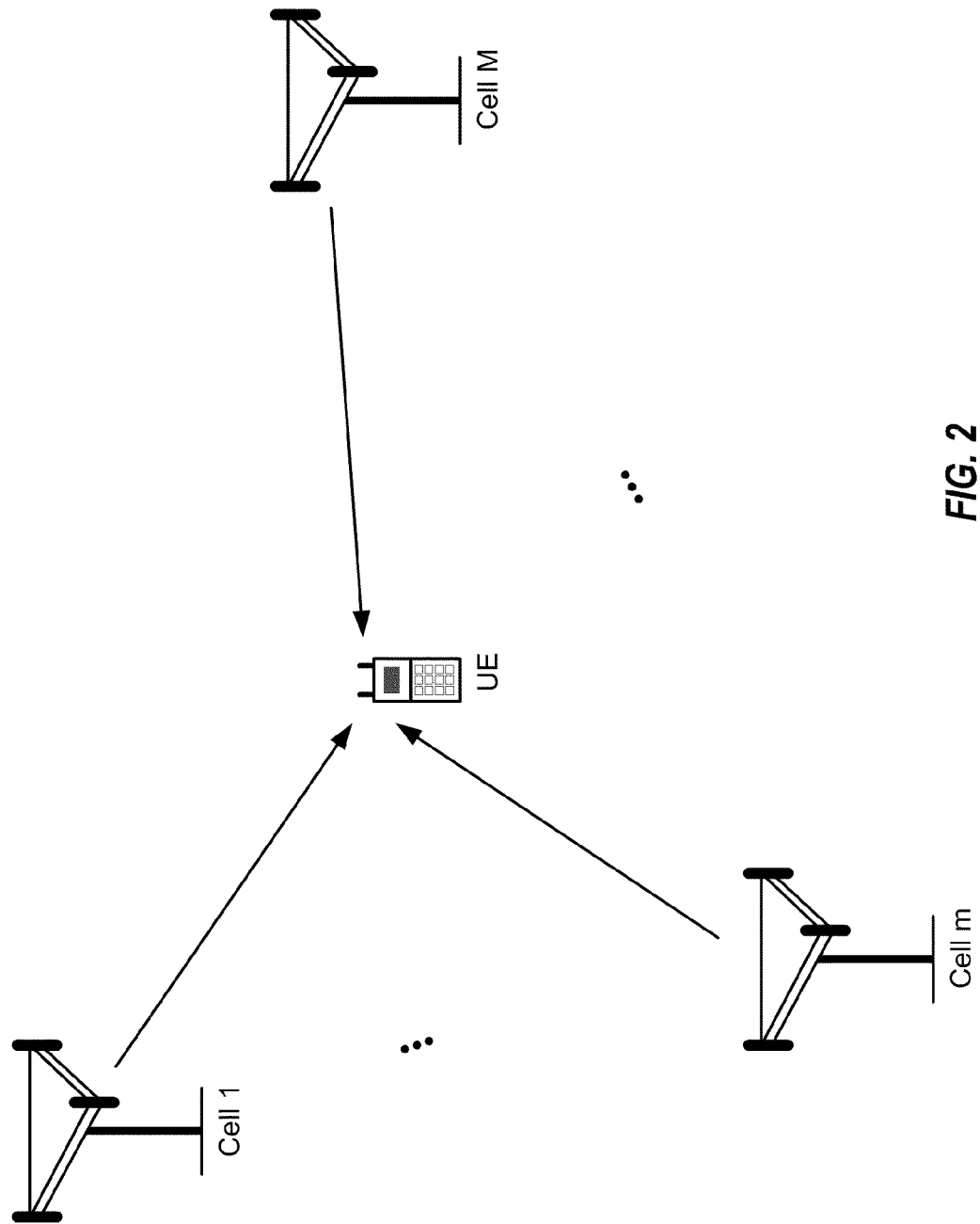
FIG. 2 shows data transmission from multiple cells to a UE.

FIG. 2 shows an example of CoMP transmission from multiple cells to a single UE. The UE may have a measurement set, which may include all cells that can participate in CoMP transmission. These cells may belong to the same eNB or different eNBs and may be selected based on channel gain/pathloss, received signal strength, received signal quality, etc. For example, the measurement set may include cells with channel gain, or received signal strength, or received signal quality above a certain threshold.

The UE may report channel state information (CSI) for the cells in the measurement set. The UE may be served by a plurality of cells in a CoMP set for either multi-point transmission (joint processing) or single-point transmission (coordinated beamforming). As noted previously, the CoMP set may include cell(s) that transmit data to the UE and cell(s) that attempt to reduce interference to the UE. The CoMP set may include all or some of the cells in the measurement set and may be dynamically selected by the wireless communication network.

Each cell may generate orthogonal frequency division multiplex (OFDM) symbols for transmission on the downlink. An OFDM symbol may be generated by (i) mapping data symbols, control symbols, and/or reference symbols to subcarriers used for transmission, (ii) mapping zero symbols with signal value of zero to subcarriers not used for transmission, (iii) performing an N-point inverse fast Fourier transform (IFFT) on N symbols mapped to N total subcarriers to obtain N time-domain samples for a useful portion, and (iv) copying the last G samples of the useful portion and appending a cyclic prefix comprising these G copied samples to the front of the useful portion to obtain an OFDM symbol comprising N+G samples. The cyclic prefix may be used to combat frequency selective fading, which may cause ISI.

As shown in FIG. 2, different cells participating in the CoMP transmission to the UE may have different channel responses and different propagation delays to the UE. Hence, the downlink transmissions from the cells may arrive at different times at the UE. Data transmission performance may degrade if there is excessive delay spread between the different cells.

Figure 3:
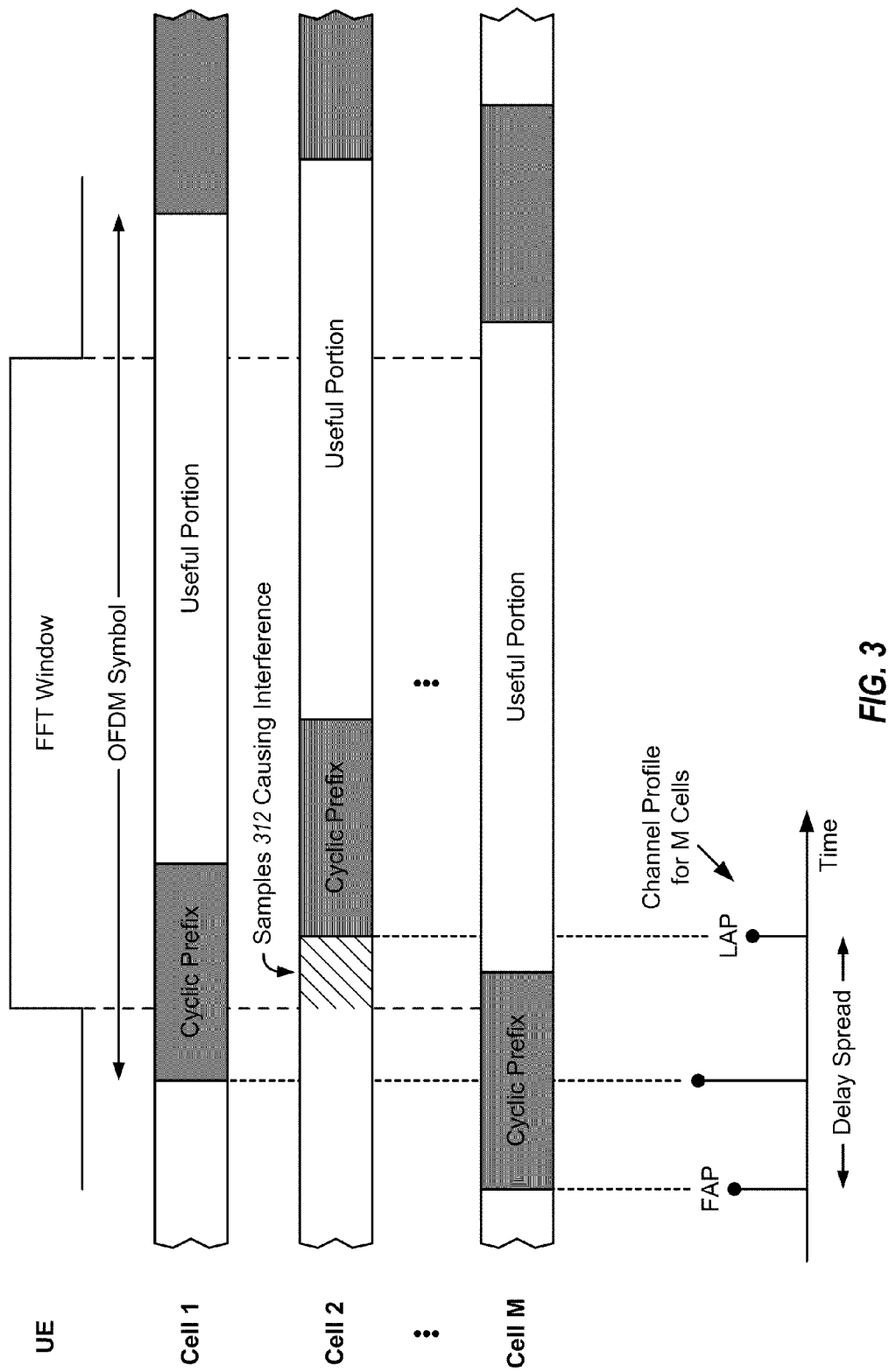
FIG. 3 shows received transmissions from multiple cells at a UE.

FIG. 3 shows received downlink transmissions at the UE from the M cells depicted in FIG. 2. For simplicity, FIG. 3 shows each cell having a single signal path to the UE. In general, each cell may have any number of signal paths to the UE, and each signal path may have any complex gain and propagation delay. The M cells may transmit M OFDM symbols on the downlink in a given symbol period. The UE may receive the M OFDM symbols from the M cells at different receive times. The receive time of the OFDM symbol from each cell may be dependent on the propagation delay from that cell to the UE. A received signal at the UE would include a superposition of all received OFDM symbols from all cells.

The UE may use an FFT window to select N received samples for processing and to discard the remaining received samples. The N received samples selected by the FFT window can include all N time-domain samples that make up the useful portion of each OFDM symbol. In the present example, the FFT window includes N time-domain samples for cells 1 and M, but no samples for cell 2. In particular, the FFT window includes some time-domain samples 312 from a previous OFDM symbol for cell 2. Samples 312 would act as inter-symbol interference that may degrade performance.

In general, inter-symbol interference may be avoided when (i) the OFDM symbols from all cells are received within the cyclic prefix at the UE and (ii) the FFT window is properly placed such that it can capture N time-domain samples of each received OFDM symbol. Condition (i) may be achieved by ensuring that the time difference between the earliest received OFDM symbol and the latest received OFDM symbol at the UE is less than the cyclic prefix length. This may in turn be achieved by allowing transmission by cells with receive times within the cyclic prefix and disallowing transmission by cells with receive times outside the cyclic prefix at the UE. Condition (ii) may be achieved with a time tracking loop (TTL) that can set the FFT window at the appropriate time/sample location.

FIG. 3 also shows an exemplary channel profile for the M cells. The channel profile may include a number of channel taps at different delays. The channel tap at delay m may be associated with a signal path having a complex gain of $h_m$ and a delay of m. The delay spread is the difference between the receive time of the first arriving path (FAP) and the receive time of the last arriving path (LAP) at the UE. The delay spread should be less than the cyclic prefix length to avoid inter-symbol interference.

In an aspect, a UE may report timing information for cells to support CoMP transmission to the UE. The timing information may convey the receive time of each cell that can participate in CoMP transmission to the UE (e.g., relative to a reference time). The timing information may be used to select cells to participate in CoMP transmission to the UE and/or to select a transmission mode for each cell, as described below.

In general, the UE may report the channel state information (CSI) and timing information to support CoMP transmission, both in terms of the selection of participating cells and for determining a coordinated transmission mode to the UE. The channel state information may be indicative of the channel responses for different cells, whereas the timing information may be indicative of the receive times at the UE of signals transmitted by the different cells.

The UE may report CSI based on explicit channel feedback (also referred to as explicit feedback) or implicit channel feedback (also referred to as implicit feedback). For explicit feedback, the UE may report CSI indicative of the channel responses for different cells, as observed by the UE, without assuming any transmitter or receiver spatial processing. For example, the CSI for explicit feedback may comprise (i) channel matrices indicative of the channel responses for the cells or (ii) eigenvectors obtained by performing singular value decomposition of the channel matrices. For implicit feedback, the UE may report CSI determined based on the channel responses for different cells and possibly assuming certain transmitter and/or receiver spatial processing. For example, the CSI for implicit feedback may comprise precoding matrix indicator (PMI), rank indicator (RI), and/or channel quality indicator (CQI) determined based on the channel responses and received signal qualities for different cells.

The UE may determine timing information for cells in a measurement set in various manners. In one design, the timing information may comprise a receive time of each cell at the UE relative to a reference time. In one design, the receive time of each cell may be determined based on a channel impulse response (CIR) for that cell. The CIR may be estimated as described below. In one design, the reference time may be determined based on a CIR for a reference cell, or a composite CIR for a set of cells, or the timing of a reference source. The reference cell may be the serving cell for the UE, the strongest cell received by the UE, the earliest arriving cell at the UE, etc.

Figure 4:
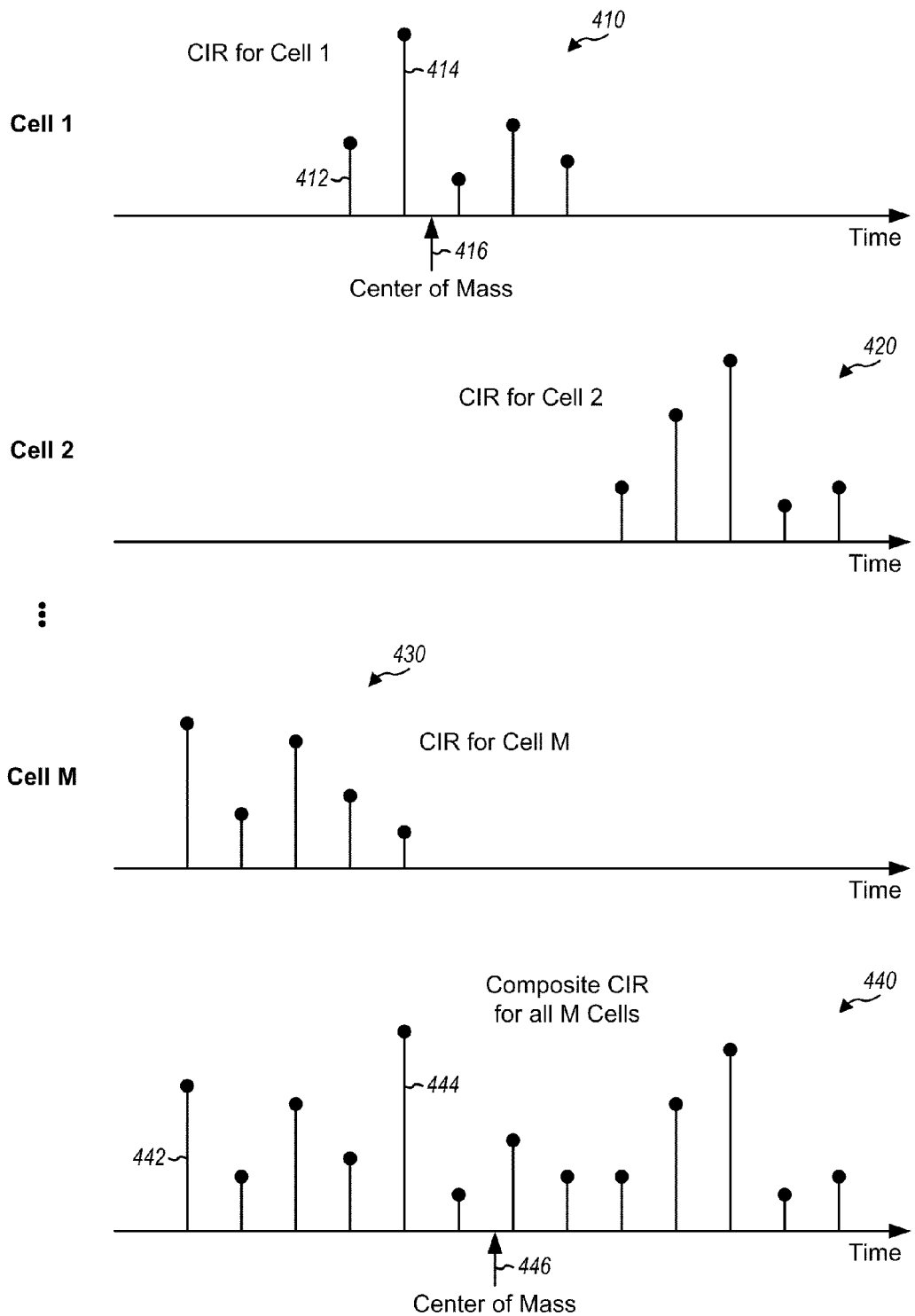
FIG. 4 shows exemplary channel impulse responses (CIRs) for multiple cells.

FIG. 4 shows exemplary CIRs for M cells in a UE measurement set. Cell 1 may have a CIR 410, cell 2 may have a CIR 420, and so on, and cell M may have a CIR 430. The CIR for each cell may include a number of channel taps at different delays and may be determined as described below. The channel tap at delay m may be associated with a signal path having a complex gain of $h_m$ and a propagation delay of m. Different cells may have different CIRs, which may be dependent on the location of each cell and the wireless environment. A composite CIR 440 may be a superposition of CIRs 410 through 430 for all M cells and may include all channel taps in CIRs 410 through 430.

The reference time for the timing information may be defined in various manners. In one design, the reference time may correspond to a first arriving path 442 in the composite CIR. The reference time may also correspond to a strongest path 444 in the composite CIR. As another example, the reference time may correspond to a center of mass/gravity (at pointer 446) of the composite CIR. The center of mass may be determined as follows:

$$d_c = \frac{\sum_i |h_i|^2 d_i}{\sum_i |h_i|^2}, \qquad \text{Eq (1)}$$

where $h_i$ is the complex gain and $d_i$ is the delay for the i-th channel tap, and $d_c$ is the center of mass.

In another design, the reference time may correspond to the first arriving path, or the strongest path, or the center of mass of the CIR for a reference cell. The reference cell may be the serving cell, or the strongest cell, or the earliest cell at the UE. In still another design, the reference time may correspond to the receive time of the earliest arriving cell at the UE. In yet another design, the reference time may correspond to the receive time of a transmission from a reference source. The resource source may be a satellite, a cell or base station, a broadcast station, etc. In yet another design, the reference time may correspond to a transmit time or a receive time at the UE. The reference time may also be defined in other manners.

The receive time of each cell may be determined in various manners. In one design, the receive time of a cell may correspond to the first arriving path (e.g., path 412 in FIG. 4) in a CIR for the cell. In another design, the receive time may correspond to the strongest path (e.g., path 414) in the CIR for the cell. In yet another design, the receive time may correspond to the center of mass (e.g., at pointer 416) of the CIR for the cell. The receive time of each cell may also be determined in other manners.

In one design, the timing information for each cell may comprise a time difference between the receive time of the cell at the UE and the reference time. The time difference for each cell may be determined as follows:

$$\Delta T_m = T_{RX,m} - T_{REF}, \qquad \text{Eq (2)}$$

where $T_{RX,m}$ is the receive time of cell m at the UE,
$T_{REF}$ is the reference time, and
$\Delta T_m$ is the time difference for cell m.

The time difference for each cell may be a positive or negative value, depending on whether the receive time of the cell is before or after the reference time. If the reference time is the receive time of the earliest arriving cell, then the time difference for each cell may be a positive value. In any case, the time difference for each cell may be quantized to a sufficient number of bits. The timing information reported by the UE may then include a quantized time difference for each cell in the measurement set.

In another design, the timing information for each cell may comprise an indication of whether the receive time of the cell is within a timing window at the UE. The timing window may have a width that is equal to the cyclic prefix or a fraction of the cyclic prefix. The receive time of each cell may be determined based on any of the designs described above. All cells with receive times that fall within the timing window may be identified. This may be achieved in various manners. For example, the receive times of all cells may be ordered from earliest to latest. The timing window may then be placed such that it captures (i) as many cells as possible, or (ii) cells with the largest total energy, or (iii) cells defined based on other criteria. All cells whose receive times are within the timing window would then be within the cyclic prefix at the UE.

In one design, a bitmap may be used to provide the timing information and may include one bit for each cell in the measurement set. Each bit may be set to (i) a first value (e.g., '1') to indicate that the receive time of the cell is within the timing window (and hence within the cyclic prefix) or (ii) a second value (e.g., '0') to indicate that the receive time of the cell is outside the timing window. The UE may include the bitmap with the timing information or as part of its timing report.

The timing information reported by the UE may also include other information indicative of the receive times of downlink transmissions from different cells at the UE.

The UE may report the timing information for the cells in the measurement set in various manners. In one design, the UE may report the timing information periodically at reporting intervals, which may be configured for the UE. In another design, the UE may report the timing information when triggered, e.g., by a request from the serving cell or by the UE. In one design, the UE may report the timing information along with the CSI, e.g., in a joint feedback report. In another design, the UE may report the timing information independent of the CSI, e.g., in separate feedback reports. In one design, the UE may report the timing information to the serving cell, which may then forward the timing information to other cells in the measurement set. In another design, the UE may report the timing information for each cell directly to that cell. The UE may also report the timing information in other manners.

In one design, a designated network entity may receive the timing information and the CSI for the cells in the measurement set and may coordinate data transmission to the UE. The designated network entity may be the serving cell, or a network controller (e.g., network controller 130 in FIG. 1), or some other entity.

In one design, the timing information may be used to select cells that can participate in CoMP transmission with joint processing to the UE. All cells participating in joint processing would transmit downlink transmissions to the UE. The receive times of the downlink transmissions from these cells should be within the cyclic prefix at the UE in order to mitigate inter-symbol interference. In one design, cells with receive timing within the timing window may participate in CoMP transmission with joint processing to the UE. These cells may be identified based on the time differences, or the bitmap, or some other information reported by the UE. The timing window may have a width that is equal to the cyclic prefix or a fraction of the cyclic prefix. The use of a timing window that is smaller than the cyclic prefix length may provide some margins to ensure that all or most signal paths from the selected cells will be within the cyclic prefix at the UE. The amount of reduction in the timing window may be dependent on the amount of dispersion in the CIRs for the cells. In particular, progressively smaller timing window may be used for progressively more dispersive CIRs, and vice versa. Inter-symbol interference at the UE for CoMP transmission with joint processing may be mitigated by selecting cells with receive times that fall within the timing window.

In one design, cells with receive times within the timing window at the UE may be selected to participate in coordinated beamforming or coordinated silencing for the UE. Cells with receive times within the timing window may also coordinate for data transmission to the UE in other manners.

In one design, cells with receive times outside the timing window at the UE may not participate in joint processing for the UE. However, these cells may participate in coordinated beamforming or coordinated silencing for the UE. For coordinated beamforming, a non-serving cell may send data transmission to another UE with precoding information that is determined so as to steer its transmission away from the UE and to thereby reduce inter-cell interference. For coordinated silencing, a non-serving cell may avoid transmitting on the time-frequency resource in which the serving cell sends data transmission to the UE.

For both coordinated beamforming and coordinated silencing, if the receive time of the non-serving cell is outside of the cyclic prefix at the UE, then the UE may observe some inter-cell interference (e.g., corresponding to samples 312 in FIG. 3). This inter-cell interference may be comparable to the case in which the non-serving cell does not participate in coordinated beamforming or coordinated silencing for the UE. Hence, there may be slight performance degradation due to cells with receive times outside the timing window participating in coordinated beamforming or coordinated silencing for the UE.

The receive time of a cell at the UE may be determined based on a CIR for the cell, as described above. The CIR may be estimated by the UE based on a reference signal, a synchronization signal, and/or some other signal transmitted by the cell. A reference signal is a signal that is known a priori by a transmitter and a receiver and may also be referred to as pilot. In LTE, each cell may transmit a cell-specific reference signal (CRS) that may be used by UEs for channel estimation. A CRS is a reference signal that is specific for a cell, e.g., generated based on a cell identity (ID). The UE may estimate the channel response (e.g., the CIR) for each cell based on the CRS from that cell.

Figure 5:
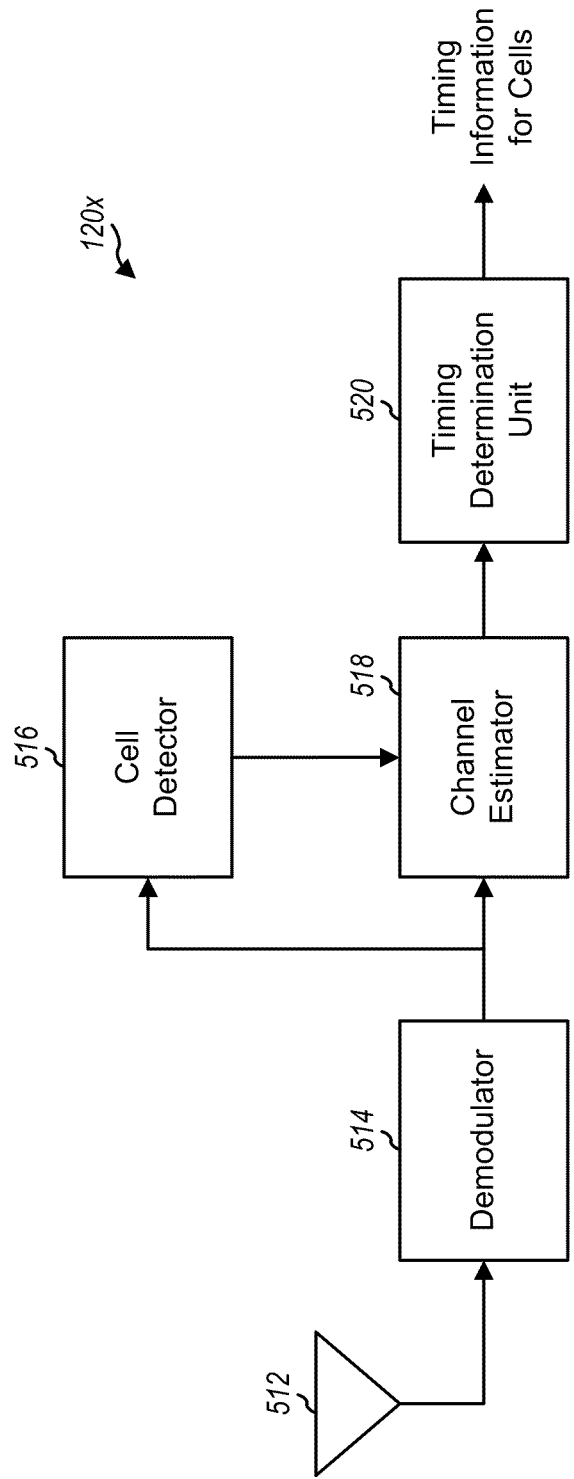
FIG. 5 shows a block diagram of a UE.

FIG. 5 shows a block diagram of a UE 120x, which may be one of the UEs in FIG. 1. Within UE 120x, an antenna 512 may receive downlink signals from a plurality of cells and may provide a received signal to a demodulator 514. Demodulator 514 may perform demodulation on the received signal and provide received symbols. A cell detector 516 may process the received symbols to detect cells of sufficient strength, e.g., based on a primary synchronization signal (PSS) and a secondary synchronization signal (SSS) transmitted by each cell. A channel estimator 518 may process the received symbols to derive channel estimates (e.g., channel impulse response estimates) for the detected cells. A timing determination unit 520 may determine timing information for the detected cells based on the corresponding channel estimates. The timing information can be determined using any of the designs described above.

Figure 6:
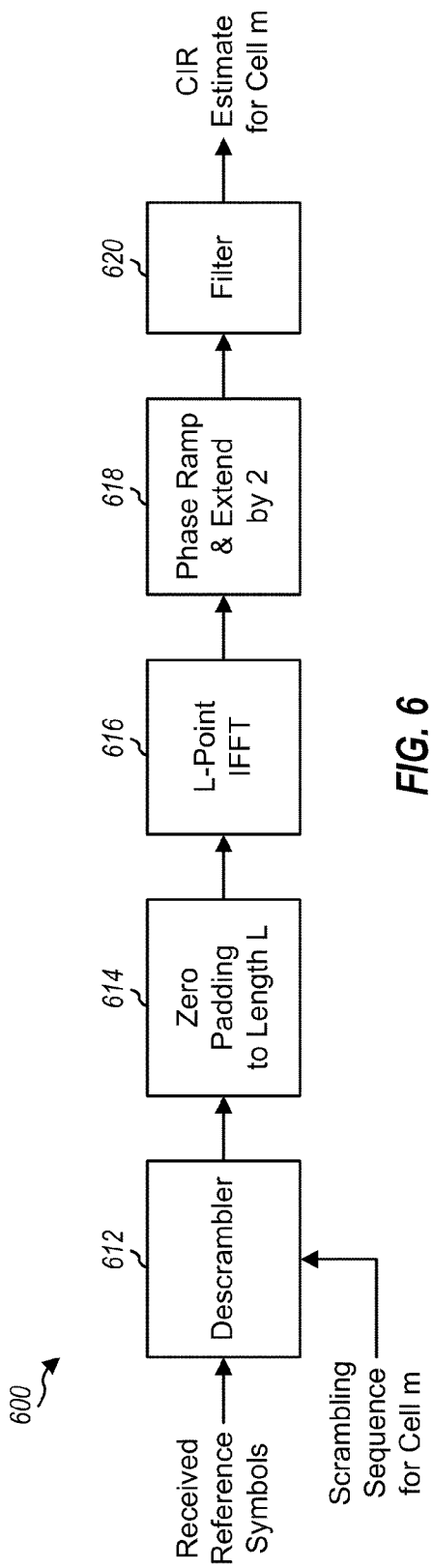
FIG. 6 shows a block diagram of a CIR estimator.

FIG. 6 shows a block diagram of a design of a CIR estimator 600, which may be use for channel estimator 518 in FIG. 5. CIR estimator 600 may obtain received reference symbols from subcarriers used to transmit the CRS (or pilot subcarriers). In LTE, each cell may transmit the CRS from one or more transmit antennas, and the pilot subcarriers for each transmit antenna may be spaced apart by six subcarriers in one symbol period and may be staggered by three subcarriers between symbol periods. For clarity, the processing to derive a CIR estimate for one cell m is described below. The processing may be repeated to obtain a CIR estimate for each cell in a measurement set.

Within CIR estimator 600, a descrambler 612 may remove the modulation on received reference symbols based on a scrambling sequence for cell m to obtain channel gains for the pilot subcarriers. A unit 614 may receive the channel gains from descrambler 612 and may append a sufficient number of zeros to obtain L channel gains and zeros, where L may be the smallest power of two that is equal to or larger than the number of pilot subcarriers for one transmit antenna in one symbol period. A unit 616 may perform an L-point IFFT on the L channel gains and zeros to obtain an initial CIR estimate comprising L channel taps. A unit 618 may extend the initial CIR estimate by a factor of two, apply a phase ramp determined based on a subcarrier offset for the pilot subcarriers, and provide an extended CIR estimate comprising 2 L channel taps.

In LTE, 2048 total subcarriers may be available for a system bandwidth of 20 MHz. However, only 1320 subcarriers may be used for transmission, and the remaining subcarriers may serve as guard band. A total of 220 pilot subcarriers may be present among the 1320 used subcarriers. A total of 220 channel gains may be obtained for the 220 pilot subcarriers in one symbol period and may be extended to a length of 256 by appending 36 zeros. A 256-point IFFT may then be performed on the 256 channel gains and zeros to obtain an initial CIR estimate comprising 256 channel taps. Unit 618 may perform interpolation to obtain a channel gain for every three subcarriers based on received reference symbols for every sixth subcarrier. Unit 618 may also apply a phase ramp on the channel taps in the time domain to account for the CRS being transmitted on staggered pilot subcarriers in different symbol periods.

A filter 620 may receive the extended CIR estimate from unit 618 in each symbol period in which the CRS is transmitted and may filter the extended CIR estimates across symbol periods. Filter 620 may provide a 2 L-tap CIR estimate for cell m in each symbol period in which the CRS is transmitted.

FIG. 6 shows a specific design of deriving a CIR estimate based on received reference symbols. In another design, the L channel gains and zeros from unit 614 may be interpolated to obtain 2 L interpolated channel gains. A 2 L-point IFFT may then be performed on the 2 L interpolated channel gains. De-staggering and compensation for frequency shift of the pilot subcarriers may thus be performed in the time domain (as shown in FIG. 6) or in the frequency domain.

A CIR estimate may also be derived in other manners. In another design, a CIR estimate may be derived by correlating a received signal (e.g., a received reference signal or a received synchronization signal) at the UE against a known sequence for the received signal at different time offsets. The correlation result at each time offset may correspond to a channel tap at a delay corresponding to that time offset.

Figure 7:
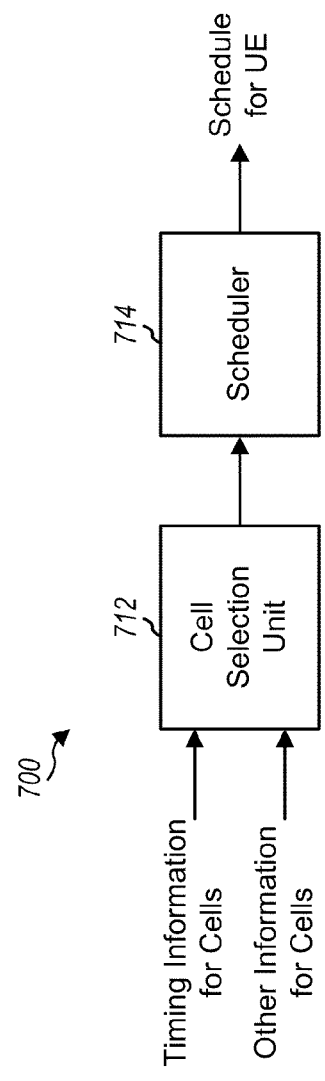
FIG. 7 shows a block diagram of a scheduling module.

FIG. 7 shows a block diagram of a design of a scheduling module 700 that uses timing information to facilitate data transmission to a UE. Module 700 may be part of an eNB/base station or some other entity. Within module 700, a cell selection unit 712 may receive timing information and possibly other information (e.g., received signal strength information) for cells from a UE and may select at least one cell to transmit data to the UE based on the timing information. A scheduler 714 may schedule the UE for data transmission by the selected cell(s). For example, scheduler 714 may determine whether to schedule the UE for joint processing or coordinated beamforming for CoMP.

Figures 8, 9:
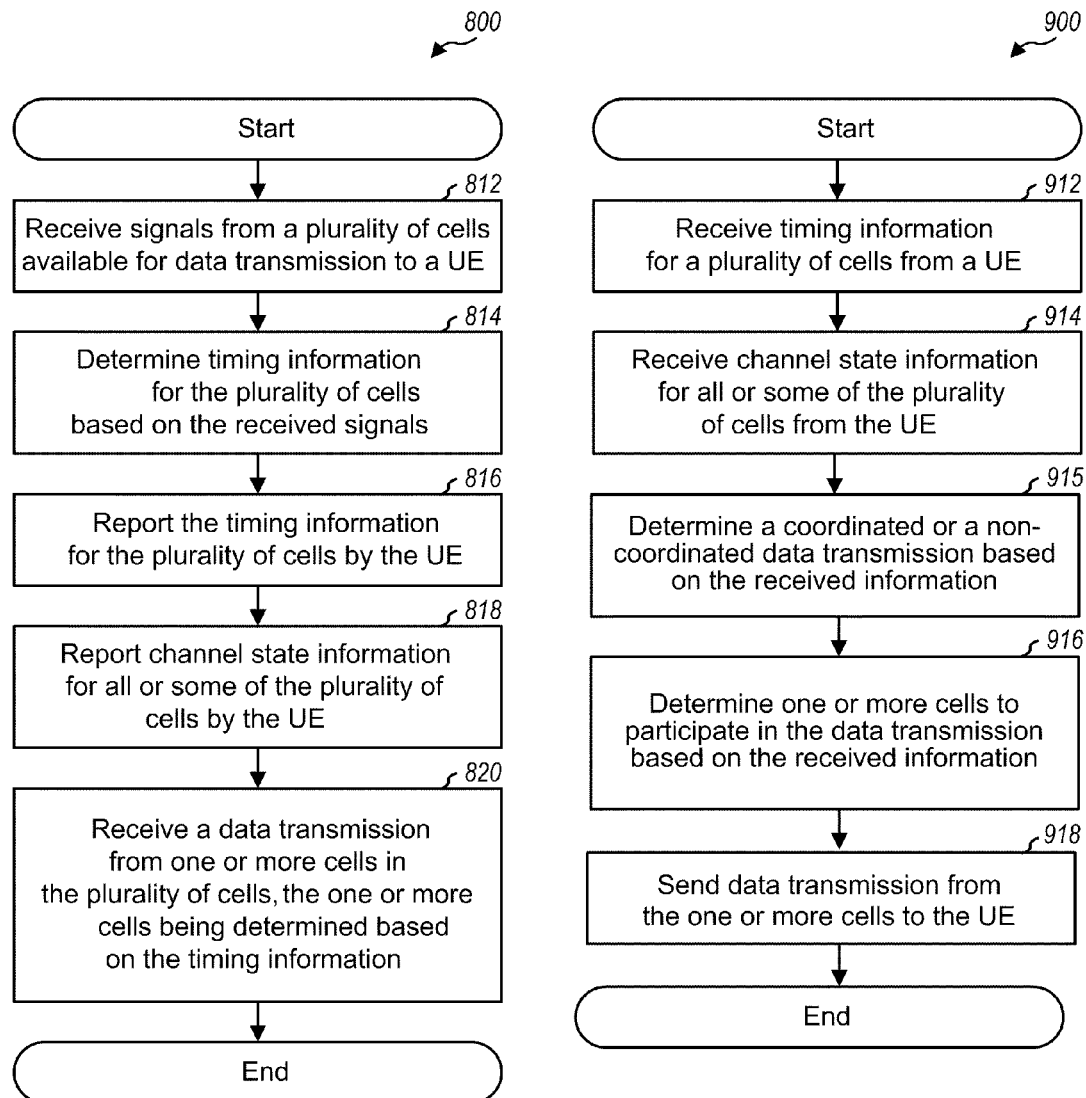
FIG. 8 shows a process for reporting timing information by a UE.
FIG. 9 shows a process for receiving timing information from a UE.

FIG. 8 shows a design of a process 800 for reporting timing information to facilitate data transmission. Process 800 may be performed by a UE (as described herein) or by some other entity. The UE may receive signals from a plurality of cells available for data transmission to the UE (block 812). The signal(s) from each cell may comprise one or more synchronization signals, one or more reference signals, etc. In one design, the plurality of cells may be available for coordinated transmission to the UE. The UE may determine timing information for the plurality of cells based on the signals received from the plurality of cells (block 814). The timing information may be indicative of receive times of the signals received from the plurality of cells at the UE.

The UE may report the timing information for the plurality of cells for use to coordinate data transmission to the UE (block 816). The UE may also determine and report channel state information for all or some of the plurality of cells for use for data transmission to the UE (block 818). For example, the UE may report channel state information for all cells or only cells associated with receive times within a timing window at the UE. The UE may report the timing information and the channel state information for the plurality of cells in various manners, as described above. The UE may receive data transmission from at least one cell among the plurality of cells (block 820). The at least one cell may be determined based at least in part on the timing information for the plurality of cells. The data transmission may be sent by the at least one cell based on the channel state information (if reported by the UE).

In one design of block 814, the UE may determine a receive time of each of the plurality of cells at the UE. The receive time of each cell may be determined based on a first arriving path, or a strongest path, or a center of mass of a channel impulse response for the cell (e.g., as shown in FIG. 4). The UE may determine the timing information based on the receive times of the plurality of cells at the UE. In one design, the timing information may be indicative of whether the receive time of each cell is within the timing window at the UE. The timing window may have a width equal to a cyclic prefix or a fraction of the cyclic prefix. The timing information may be provided in various formats and may comprise a time difference for each cell, a bitmap for all cells, etc.

In one specific design, the UE may determine a reference time, e.g., based on a first arriving path, or a strongest path, or a center of mass of (i) a channel impulse response for a designated cell or (ii) a composite channel impulse response for at least two cells among the plurality of cells. The designated cell may be the serving cell, the strongest cell, the first arriving cell, etc. The UE may determine the receive time of each of the plurality of cells at the UE. The UE may determine a time difference for each cell based on the receive time of the cell and the reference time. The UE may then determine the timing information based on the time differences for the plurality of cells.

In one design, a coordinated transmission or a non-coordinated transmission may be selected for the UE based on the timing information. For example, a coordinated transmission may be selected for the UE if multiple cells are associated with receive times within the timing window, and a non-coordinated transmission may be selected for the UE if only one cell is associated with a receive time within the timing window. A coordinated transmission or a non-coordinated transmission may also be selected for the UE in other manners, e.g., based on other criteria.

In one design, a particular coordinated transmission mode may also be selected for the UE based on the timing information. For example, a joint processing transmission mode may be selected for the UE if multiple cells are associated with receive times within the timing window. A coordinated beamforming transmission mode or a coordinated silencing transmission mode may be selected for the UE if only one cell is associated with a receive time within the timing window. The particular coordinated transmission mode may also be selected for the UE in other manners, e.g., based on other criteria.

In one design of block 820, the UE may receive the data transmission from multiple cells, which may participate in coordinated/CoMP transmission with joint processing to the UE. Each of the multiple cells may have a receive time within the timing window at the UE. In another design, at least one other cell may perform coordinated beamforming or coordinated silencing for the UE. Each cell performing coordinated beamforming or coordinated silencing may have a receive time that is either within the timing window or outside the timing window at the UE. Cells may be selected for data transmission to the UE based on the timing information in other manners.

FIG. 9 shows a design of a process 900 for receiving timing information to facilitate data transmission. Process 900 may be performed by one or more entities in a wireless network, e.g., a serving cell, a non-serving cell, a network controller, etc. Timing information for a plurality of cells may be received from a UE (block 912). The timing information may be indicative of the receive times of signals from the plurality of cells at the UE. Channel state information for the plurality of cells may also be received from the UE (block 914).

Based on the information received, a coordinated or a non-coordinated data transmission can be determined (Block 915). In one design, a coordinated transmission mode may also be selected for the UE based on the timing information. One or more cells from among the plurality of cells may be determined to participate in the data transmission based at least in part on the timing information for the plurality of cells (block 916). The data transmission may be sent from the at least one cell to the UE, e.g., based on the channel state information if received from the UE (block 918).

In one design of block 916, whether the receive time of each of the plurality of cells is within the timing window at the UE may be determined based on the timing information. The one or more cells may be selected from among all cells with receive times within the timing window. In one design, a time difference for each cell may be obtained from the timing information. The time difference for each cell may be determined based on the receive time of the cell at the UE and a reference time. The at one or more cells may then be selected based on the time differences for the plurality of cells.

In one design, multiple cells may be selected for data transmission to the UE and each may participate in a coordinated/CoMP transmission with joint processing to the UE. Each of the multiple cells may have a receive time within the timing window at the UE. In one design, at least one other cell may be selected from among the plurality of cells to perform coordinated beamforming or coordinated silencing for the UE. The at least one other cell may be selected based on the timing information for the plurality of cells. Each of the at least one other cells may have a receive time that is either within the timing window or outside the timing window at the UE.

Reporting of timing information for cells by a UE, as described herein, may provide certain advantages. The timing information may be used to coordinate data transmission to the UE. For example, the timing information may enable selection of one or more suitable cells to transmit data to the UE so that good performance can be achieved. The timing information reported by the UE to facilitate data transmission on the downlink may be very different from time difference of arrivals (TDOAs) and other time measurements conventionally reported by UEs for positioning to determine the locations of the UEs.

Figure 10:
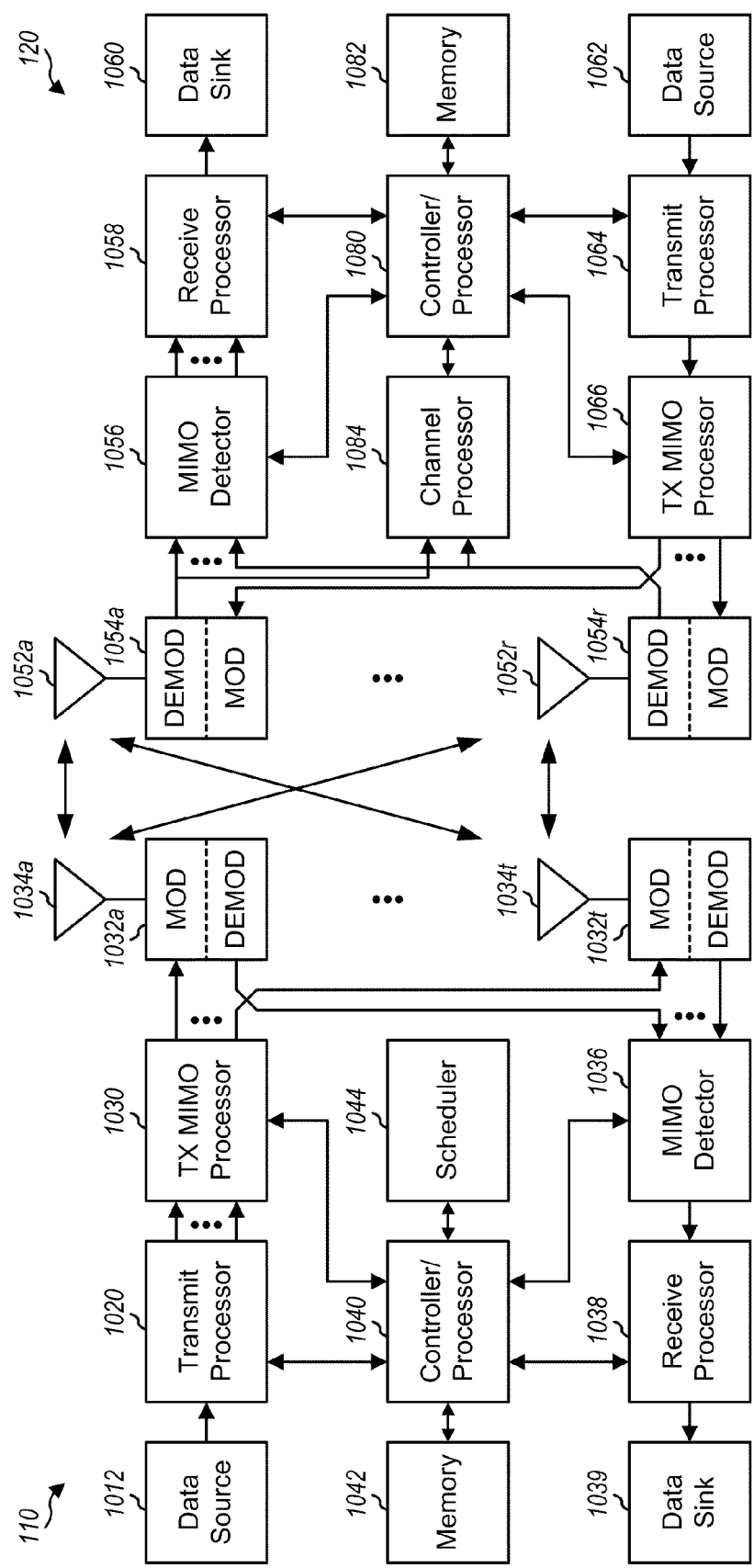
FIG. 10 shows a block diagram of a base station and a UE.

FIG. 10 shows a block diagram of a design of a base station/eNB 110 and a UE 120, which may be one of the base stations/eNBs and one of the UEs in FIG. 1. Base station 110 may serve one or more cells and may be equipped with T antennas 1034a through 1034t, where T≥1. UE 120 may be equipped with R antennas 1052a through 1052r, where R≥1.

At base station 110, a transmit processor 1020 may receive data for one or more UEs from a data source 1012, process the data for each UE based on one or more modulation and coding schemes, and provide data symbols for all UEs. Processor 1020 may also receive and process control information from a controller/processor 1040 and provide control symbols. Processor 1020 may also generate reference symbols for the CRS, PSS and SSS for each cell supported by base station 110. A transmit (TX) multiple-input multiple-output (MIMO) processor 1030 may perform precoding on the data symbols, the control symbols, and/or the reference symbols, if applicable, and may provide T output symbol streams to T modulators (MODs) 1032a through 1032t. Each modulator 1032 may process a respective output symbol stream (e.g., for OFDM, etc.) to obtain an output sample stream. Each modulator 1032 may further process (e.g., convert to analog, amplify, filter, and upconvert) the output sample stream to obtain a downlink signal. T downlink signals from modulators 1032a through 1032t may be transmitted via T antennas 1034a through 1034t, respectively.

At UE 120, antennas 1052a through 1052r may receive the downlink signals from base station 110 and other base stations and may provide received signals to demodulators (DEMODs) 1054a through 1054r, respectively. Each demodulator 1054 may condition (e.g., filter, amplify, downconvert, and digitize) a respective received signal to obtain input samples. Each demodulator 1054 may further process the input samples (e.g., for OFDM, etc.) to obtain received symbols. A MIMO detector 1056 may obtain received symbols from all R demodulators 1054a through 1054r, perform MIMO detection on the received symbols if applicable, and provide detected symbols. A receive processor 1058 may process (e.g., demodulate and decode) the detected symbols, provide decoded data for UE 120 to a data sink 1060, and provide decoded control information to a controller/processor 1080.

On the uplink, at UE 120, a transmit processor 1064 may receive data from a data source 1062 and control information (e.g., channel state information and timing information for cells in a measurement set) from controller/processor 1080.

Processor 1064 may process (e.g., encode and modulate) the data and control information to obtain data symbols and control symbols, respectively. Processor 1064 may also generate reference symbols for one or more reference signals. The symbols from transmit processor 1064 may be precoded by a TX MIMO processor 1066 if applicable, further processed by modulators 1054a through 1054r (e.g., for SC-FDM, OFDM, etc.), and transmitted to base station 110 and possibly other base stations. At base station 110, the uplink signals from UE 120 and other UEs may be received by antennas 1034, processed by demodulators 1032, detected by a MIMO detector 1036 if applicable, and further processed by a receive processor 1038 to obtain decoded data and control information sent by UE 120 and other UEs. Processor 1038 may provide the decoded data to a data sink 1039 and the decoded control information to controller/processor 1040.

A channel processor 1084 may estimate the channel response (e.g., the CIR) for each cell in the measurement set for UE 120. Processor 1084 may implement channel estimator 518 in FIG. 5 and/or CIR estimator 600 in FIG. 6. Processor 1080 and/or 1084 may determine channel state information and timing information for the cells in the measurement set based on the estimated channel responses for the cells, e.g., as described above.

Controllers/processors 1040 and 1080 may direct the operation at base station 110 and UE 120, respectively. Processor 1080 and/or other processors and modules at UE 120 may perform or direct process 800 in FIG. 8 and/or other processes for the techniques described herein. Processor 1040 and/or other processors and modules at base station 110 may perform or direct process 900 in FIG. 9 and/or other processes for the techniques described herein. Processor 1040 may implement cell detection unit 516 and timing determination unit 520 in FIG. 5. Memories 1042 and 1082 may store data and program codes for base station 110 and UE 120, respectively. A scheduler 1044 may schedule UEs for data transmission on the downlink and/or uplink. Scheduler 1044 may implement cell selection unit 712 and scheduler 714 in FIG. 7.

In one configuration, apparatus 120 for wireless communication may include means for receiving signals from a plurality of cells available for data transmission to a UE, means for determining timing information for the plurality of cells based on the signals received from the plurality of cells, means for reporting the timing information for the plurality of cells by the UE, means for reporting channel state information for the plurality of cells by the UE for use for data transmission to the UE, and means for receiving data transmission from at least one cell among the plurality of cells. The at least one cell may be determined based at least in part on the timing information for the plurality of cells. The data transmission may be sent by the at least one cell based on the channel state information, if reported by the UE.

In one configuration, apparatus 110 for wireless communication may include means for receiving timing information for a plurality of cells from a UE, means for receiving channel state information for the plurality of cells from the UE, means for determining at least one cell among the plurality of cells based at least in part on the timing information for the plurality of cells, and means for sending data transmission from at least one cell to the UE. The data transmission may be sent by the at least one cell based on the channel state information, if reported by the UE.

In an aspect, the aforementioned means may be processor(s) 1020, 1038 and/or 1040 at base station 110 and/or processors(s) 1058, 1064 and/or 1080 at UE 120, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    receiving at a user equipment (UE) signals from a plurality of cells available for coordinated multipoint (COMP) data transmissions to the UE, each of the plurality of cells associated with a separate base station;
    determining timing information for the plurality of cells based on the received signals, the timing information comprising a receive time of each of the signals received from each of the plurality of cells, wherein the receive time of each of the signals received from each of the plurality of cells is within a timing window at the UE;
    determining the receive time of each of the signals received from each of the plurality of cells based on a first arriving path, or a strongest path, or a center of mass of a channel impulse response for a cell of the plurality of cells, wherein determining the timing information is based on the receive time of each of the signals received from each of the plurality of cells;
    sending the timing information for the plurality of cells; and
    receiving a CoMP data transmission from a portion of the plurality of cells available for CoMP data transmissions to the UE, the portion selected to participate in the CoMP data transmission based on the timing information for each of the plurality of cells, wherein the CoMP data transmission is coordinated based on the receive time of each of the signals received from each of the selected cells.

2. The method of claim 1, wherein the CoMP data transmission comprises a joint transmission, a coordinated beamforming, or a coordinated silencing by cells in the plurality of cells.

3. The method of claim 1, wherein the CoMP data transmission is associated with a second data transmission from at least one other cell, the second data transmission comprising a coordinated beamforming based at least in part on the timing information.

4. The method of claim 3, wherein the receive time of a signal received from the at least one other cell is outside the timing window at the UE.

5. The method of claim 1, wherein the CoMP data transmission is associated with a coordinated silencing of at least one other cell in the plurality of cells, and wherein the coordinated silencing is based at least in part on the timing information.

6. The method of claim 1, wherein the timing information comprises an indication of whether the receive time of each of the signals received from each of the plurality of cells is within the timing window at the UE.

7. The method of claim 6, wherein the timing window has a width determined based on a cyclic prefix of the received signals of each of the signals received from each of the plurality of cells.

8. The method of claim 1, wherein the determining the timing information comprises determining a reference time, determining a time difference for each of the plurality of cells based on the receive time of each of the signals received from each of the plurality of cells and the reference time, and determining the timing information based on time differences for the plurality of cells.

9. The method of claim 8, wherein the determining the reference time comprises determining the reference time based on a first arriving path, or a strongest path, or a center of mass of a channel impulse response for a designated cell among the plurality of cells.

10. The method of claim 8, wherein the determining the reference time comprises determining the reference time based on a first arriving path, or a strongest path, or a center of mass of a composite channel impulse response for at least two cells among the plurality of cells.

11. The method of claim 1, further comprising:
    reporting the timing information to a serving cell of the plurality of cells participating in the CoMP data transmission.

12. The method of claim 1, further comprising:
    reporting channel state information for the plurality of cells by the UE for use for data transmission to the UE.

13. The method of claim 12, further comprising:
    generating a feedback report comprising the channel state information and the timing information for the plurality of cells; and
    sending the feedback report by the UE.

14. An apparatus for wireless communication at a UE, comprising:
    means for receiving signals from a plurality of cells available for coordinated multipoint (COMP) data transmissions, each of the plurality of cells associated with a separate base station;
    means for determining timing information for the plurality of cells based on the received signals, the timing information comprising a receive time of each of the signals received from each of the plurality of cells, wherein the receive time of each of the signals received from each of the plurality of cells is within a timing window at the UE;
    means for determining the receive time of each of the signals received from each of the plurality of cells based on a first arriving path, or a strongest path, or a center of mass of a channel impulse response for a cell of the plurality of cells, wherein determining the timing information is based on the receive time of each of the signals received from each of the plurality of cells;

means for sending the timing information for the plurality of cells; and means for receiving a CoMP data transmission from a portion of the plurality of cells available for CoMP data transmissions to the UE, the portion selected to participate in the CoMP data transmission based on the timing information for each of the plurality of cells, wherein the CoMP data transmission is coordinated based on the receive time of each of the signals received from each of the selected cells.

15. The apparatus of claim 14, wherein the CoMP data transmission comprises a joint transmission, a coordinated beamforming, or a coordinated silencing by cells in the plurality of cells.

16. The apparatus of claim 14, wherein the means for determining the timing information comprises means for determining a reference time, means for determining a time difference for each of the plurality of cells based on the receive time of each of the signals received from each of the plurality of cells and the reference time, and means for determining the timing information based on time differences for the plurality of cells.

17. The apparatus of claim 14, further comprising:
means for determining channel state information for the plurality of cells by the UE;
means for generating a feedback report comprising the channel state information and the timing information for the plurality of cells; and
means for sending the feedback report by the UE.

18. An apparatus for wireless communication at a UE, comprising:
at least one processor configured to:
receive signals from a plurality of cells available for coordinated multipoint (COMP) data transmissions, each of the plurality of cells associated with a separate base station;
determine timing information for the plurality of cells based on the received signals, the timing information comprising a receive time of each of the signals received from each of the plurality of cells, wherein the receive time of each of the signals received from each of the plurality of cells is within a timing window at the UE;
determine the receive time of each of the signals received from each of the plurality of cells based on a first arriving path, or a strongest path, or a center of mass of a channel impulse response for a cell of the plurality of cells, wherein the timing information is determined based on the receive time of each of the signals received from each of the plurality of cells;
send the timing information for the plurality of cells; and
receive a CoMP data transmission from a portion of the plurality of cells available for CoMP data transmissions to the UE, the portion selected to participate in the CoMP data transmission based on the timing information for each of the plurality of cells, wherein the CoMP data transmission is coordinated based on the receive time of each of the signals received from each of the selected cells.

19. The apparatus of claim 18, wherein the CoMP data transmission comprises a joint transmission, a coordinated beamforming, or a coordinated silencing by cells in the plurality of cells.

20. The apparatus of claim 18, wherein the at least one processor is configured to:
determine a reference time, determine a time difference for each of the plurality of cells based on the receive time of each of the signals received from each of the plurality of cells and the reference time, and determine the timing information based on time differences for the plurality of cells.

21. The apparatus of claim 18, wherein the at least one processor is configured to:
determine channel state information for the plurality of cells by the UE, generate a feedback report comprising the channel state information and the timing information for the plurality of cells, and send the feedback report from the UE.

22. A computer program product, comprising:
a non-transitory computer-readable medium comprising:
code for causing at least one computer to receive signals from a plurality of cells available for coordinated multipoint (CoMP) data transmissions to a user equipment (UE), each of the plurality of cells associated with a separate base station;
code for causing the at least one computer to determine timing information for the plurality of cells based on the received signals, the timing information comprising a receive time of each of the signals received from each of the plurality of cells, wherein the receive time of each of the signals received from each of the plurality of cells is within a timing window at the UE;
code for causing the at least one computer to determine the receive time of each of the signals received from each of the plurality of cells based on a first arriving path, or a strongest path, or a center of mass of a channel impulse response for a cell of the plurality of cells, wherein the timing information is determined based on the receive time of each of the signals received from each of the plurality of cells;
code for causing the at least one computer to report the timing information for the plurality of cells by the UE; and
code for causing the at least one computer to receive a CoMP data transmission from a portion of the plurality of cells available for CoMP data transmissions to the UE, the portion selected to participate in the CoMP data transmission based on the timing information for each of the plurality of cells, wherein the CoMP data transmission is coordinated based on the receive time of each of the signals received from each of the selected cells.

23. A method for wireless communication, comprising:
receiving timing information for a plurality of cells from a user equipment (UE), each of the plurality of cells available for coordinated multipoint (CoMP) data transmission to the UE and being associated with a separate base station, the timing information comprising a receive time of each signal received by the UE from each of the plurality of cells, wherein the receive time of each of the signals received by the UE from each of the plurality of cells is within a timing window at the UE, wherein the receive time of each of the signals received by the UE from the plurality of cells is based on a first arriving path, or a strongest path, or a center of mass of a channel impulse for a cell of the plurality of cells, and wherein the timing information is based on the receive time of each of the signals received by the UE from each of the plurality of cells;
selecting a portion of the plurality of cells available for CoMP data transmissions to the UE based on the timing information for each of the plurality of cells;
determining a CoMP data transmission, the CoMP data transmission coordinated based on the receive time of each of the signals received by the UE from each of the plurality of cells; and coordinating with the portion of the plurality of cells to transmit the CoMP data transmission to the UE from the portion of the plurality of cells.

24. The method of claim 23, further comprising determining a coordinated transmission mode for the UE based on the timing information.

25. The method of claim 24, wherein the coordinated transmission mode comprises a joint transmission, a coordinated beamforming, or a coordinated silencing by cells in the plurality of cells.

26. The method of claim 23, wherein the receive time of each of the signals received by the UE from each of the plurality of cells selected to participate in the CoMP data transmission is within the timing window at the UE.

27. The method of claim 23, further comprising:
determining at least one cell in the plurality of cells to perform a coordinated silencing for the UE.

28. The method of claim 23, further comprising:
determining whether the receive time of each of the signals received by the UE from each of the plurality of cells is within the timing window at the UE; and
selecting the portion of the plurality of cells to participate in the CoMP data transmission from among cells having receive times of signals received by the UE within the timing window.

29. The method of claim 23, further comprising:
obtaining a time difference for each of the plurality of cells from the timing information, the time difference for each cell being determined based on the receive time of each of the signals received by the UE from each of the plurality of cells and a reference time, and selecting the portion of the plurality of cells to participate in the CoMP data transmission based at least on the time differences.

30. The method of claim 23, further comprising:
receiving channel state information for the plurality of cells from the UE, and wherein the sending the CoMP data transmission comprises sending the CoMP data transmission from the portion of the plurality of cells based on the channel state information.

31. An apparatus for wireless communication, comprising:
means for receiving timing information for a plurality of cells from a user equipment (UE), each of the plurality of cells available for coordinated multipoint (CoMP) data transmission to the UE and being associated with a separate base station, the timing information comprising a receive time of each signal received by the UE from each of the plurality of cells, wherein the receive time for each of the plurality of cells is within a timing window at the UE, wherein the receive time of each of the signals received by the UE from the plurality of cells is based on a first arriving path, or a strongest path, or a center of mass of a channel impulse for a cell of the plurality of cells, and wherein the timing information is based on the receive time of each of the signals received by the UE from each of the plurality of cells;
means for selecting a portion of the plurality of cells available for CoMP data transmission to the UE based on the timing information for each of the plurality of cells;
means for determining a CoMP data transmission, the CoMP data transmission coordinated based on the receive time of each of the signals received by the UE from each of the plurality of cells; and
means for coordinating with the portion of the plurality of cells to transmit the CoMP data transmission to the UE from the portion of the plurality of cells.

32. The apparatus of claim 31, further comprising:
means for determining a coordinated transmission mode for the UE based on the timing information.

33. The apparatus of claim 32, wherein the coordinated transmission mode comprises a joint transmission, a coordinated beamforming, or a coordinated silencing by cells in the plurality of cells.

34. The apparatus of claim 31, further comprising:
means for determining whether the receive time of each of the signals received by the UE from each of the plurality of cells is within the timing window at the UE based on the timing information, and means for selecting the portion of the plurality of cells to participate in the CoMP data transmission from among cells having receive times of signals received by the UE within the timing window.

35. The apparatus of claim 31, further comprising:
means for obtaining a time difference for each of the plurality of cells from the timing information, the time difference for each cell being determined based on the receive time of each of the signals received by the UE from each of the plurality of cells and a reference time, and means for selecting the portion of the plurality of cells to participate in the CoMP data transmission based at least on the time differences.

36. The apparatus of claim 31, further comprising:
means for receiving channel state information for the plurality of cells from the UE, and wherein the means for sending the CoMP data transmission comprises means for sending the CoMP data transmission from the portion of the plurality of cells based on the channel state information.

37. An apparatus for wireless communication, comprising:
at least one processor configured to:
receive timing information for a plurality of cells from a user equipment (UE), each of the plurality of cells available for coordinated multipoint (COMP) data transmission to the UE and being associated with a separate base station, the timing information comprising a receive time of each signal received by the UE from each of the plurality of cells, wherein the receive time of each of the signals received by the UE from each of the plurality of cells is within a timing window at the UE, wherein the receive time of each of the signals received by the UE from the plurality of cells is based on a first arriving path, or a strongest path, or a center of mass of a channel impulse for a cell of the plurality of cells, and wherein the timing information is based on the receive time of each of the signals received by the UE from each of the plurality of cells;
select a portion of the plurality of cells available for CoMP data transmission to the UE based on the timing information for each of the plurality of cells;
determine a CoMP data transmission, the CoMP data transmission coordinated based on the receive time of each of the signals received by the UE from each of the plurality of cells; and
coordinate with the portion of the plurality of cells to transmit the CoMP data transmission to the UE from the portion of the plurality of cells.

38. The apparatus of claim 37, wherein the at least one processor is configured to determine a coordinated transmission mode for the UE based on the timing information.

39. The apparatus of claim 38, wherein the coordinated transmission mode comprises a joint transmission, a coordinated beamforming, or a coordinated silencing by cells in the plurality of cells.

40. The apparatus of claim 37, wherein the at least one processor is configured to:
determine whether the receive time of each of the signals received by the UE from each of the plurality of cells is within the timing window at the UE based on the timing information, and select the portion of the plurality of cells from among all cells having receive times within the timing window.

41. The apparatus of claim 37, wherein the at least one processor is configured to:
obtain a time difference for each of the plurality of cells from the timing information, the time difference for each cell being determined based on the receive time of each of the signals received by the UE from each of the plurality of cells and a reference time, and select the portion of the plurality of cells to participate in the CoMP data transmission based at least on the time differences.

42. The apparatus of claim 37, wherein the at least one processor is configured to:
receive channel state information for the plurality of cells from the UE, and send the CoMP data transmission from the portion of the plurality of cells based on the channel state information.

43. A computer program product, comprising:
a non-transitory computer-readable medium comprising:
code for causing at least one computer to receive timing information for a plurality of cells from a user equipment (UE), each of the plurality of cells available for coordinated multipoint (COMP) data transmission to the UE and being associated with a separate base station, the timing information comprising a receive time of each signal received by the UE from each of the plurality of cells, wherein the receive time of each of the signals received by the UE from each of the plurality of cells is within a timing window at the UE, wherein the receive time of each of the signals received by the UE from the plurality of cells is based on a first arriving path, or a strongest path, or a center of mass of a channel impulse for a cell of the plurality of cells, and wherein the timing information is based on the receive time of each of the signals received by the UE from each of the plurality of cells;
code for causing the at least one computer to select a portion of the plurality of cells available for CoMP data transmissions to the UE based on the timing information for each of the plurality of cells;
code for causing the at least one computer to determine a CoMP data transmission, the CoMP data transmission coordinated based on the receive time of each of the signals received by the UE from each of the plurality of cells; and
code for causing the at least one computer to coordinate with the portion of the plurality of cells to transmit the CoMP data transmission to the UE from the portion of the plurality of cells.

\* \* \* \* \*